United States Patent
Hong et al.

(10) Patent No.: US 9,690,980 B2
(45) Date of Patent: Jun. 27, 2017

(54) AUTOMATIC CURATION OF DIGITAL IMAGES

(71) Applicant: Google Inc., Mountain View, CA (US)

(72) Inventors: Peter J. Hong, San Francisco, CA (US); Ajmal A. Asver, San Francisco, CA (US); Chandrashekar Raghavan, San Francisco, CA (US); Denise Ho, Los Altos, CA (US); Darwin Yamamoto, San Francisco, CA (US); Erik Murphy-Chutorian, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 456 days.

(21) Appl. No.: 13/840,744

(22) Filed: Mar. 15, 2013

(65) Prior Publication Data

US 2014/0133764 A1 May 15, 2014

Related U.S. Application Data

(60) Provisional application No. 61/724,876, filed on Nov. 9, 2012.

(51) Int. Cl.
*G06K 9/00* (2006.01)
*G06F 17/30* (2006.01)
*G06K 9/03* (2006.01)

(52) U.S. Cl.
CPC ... *G06K 9/00288* (2013.01); *G06F 17/30244* (2013.01); *G06K 9/00221* (2013.01); *G06K 9/036* (2013.01)

(58) Field of Classification Search
CPC .......... G06F 17/30244; G06K 9/00221; G06K 9/00288; G06K 9/036
See application file for complete search history.

(56) References Cited

U.S. PATENT DOCUMENTS

| | | | |
|---|---|---|---|
| 8,254,647 B1 | 8/2012 | Nechyba et al. | |
| 2006/0203261 A1* | 9/2006 | Kacker | 358/1.6 |
| 2007/0030364 A1 | 2/2007 | Obrador et al. | |
| 2007/0036456 A1 | 2/2007 | Hooper | |
| 2009/0052736 A1 | 2/2009 | Kacker | |
| 2011/0103699 A1 | 5/2011 | Ke et al. | |
| 2011/0116690 A1 | 5/2011 | Ross et al. | |
| 2012/0051668 A1* | 3/2012 | Martin et al. | 382/305 |
| 2012/0099783 A1 | 4/2012 | Bourdev | |
| 2012/0173549 A1 | 7/2012 | Bouguet et al. | |
| 2013/0148864 A1* | 6/2013 | Dolson et al. | 382/115 |

* cited by examiner

*Primary Examiner* — Nirav G Patel
(74) *Attorney, Agent, or Firm* — McDermott Will & Emery LLP

(57) ABSTRACT

The disclosed subject matter relates to computer implemented methods for automatic curation of digital images. In one aspect, the method includes selecting one of every two or more duplicate digital images of a plurality of digital images. The method further includes calculating an image quality score for each of the selected digital images. The method further includes associating a ranking with each of the selected digital images based on its respective calculated image quality score.

18 Claims, 7 Drawing Sheets

AUTOMATIC CURATION OF DIGITAL IMAGES

CROSS-REFERENCES TO RELATED APPLICATIONS

The present application claims the benefit of U.S. Provisional Patent Application Ser. No. 61/724,876, titled "Automatic Curation of Digital Images," filed on Nov. 9, 2012, which is hereby incorporated by reference in its entirety for all purposes.

BACKGROUND

Users are amassing large numbers of digital images. In addition, many photographs taken using photographic film are also being converted to digital images. With ever-growing collections of digital images, it is becoming increasingly difficult for users to curate their digital image collections.

SUMMARY

The disclosed subject matter relates to a computer-implemented method for automatic curation of digital images. The method includes selecting one of every two or more duplicate digital images of a plurality of digital images. The method further includes calculating an image quality score for each of the selected digital images. The method further includes associating a ranking with each of the selected digital images based on its respective calculated image quality score.

The disclosed subject matter further relates to a system for automatic curation of digital images. The system includes a memory which includes instructions for automatic curation of digital images, and a processor. The processor is configured to execute the instructions to calculate an image quality score for a digital image, based on the image content and the metadata of the digital image. The processor is further configured to associate with the digital image, a ranking based on the calculated image quality score. The processor is further configured to provide, based on the associated ranking, the digital image for sharing by a user.

The disclosed subject matter further relates to a machine-readable storage medium including machine-readable instructions for causing a processor to execute a method for automatic curation of digital images. The method includes calculating a first image quality score for a digital image. The method further includes calculating a second image quality score for the digital image based on a hypothetical adjustment of the digital image. The method further includes committing the hypothetical adjustment to the digital image in response to a received indication of user-selection. The method further includes associating with the digital image, a ranking based on the committing of the hypothetical adjustment.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

DETAILED DESCRIPTION

Figure 1:
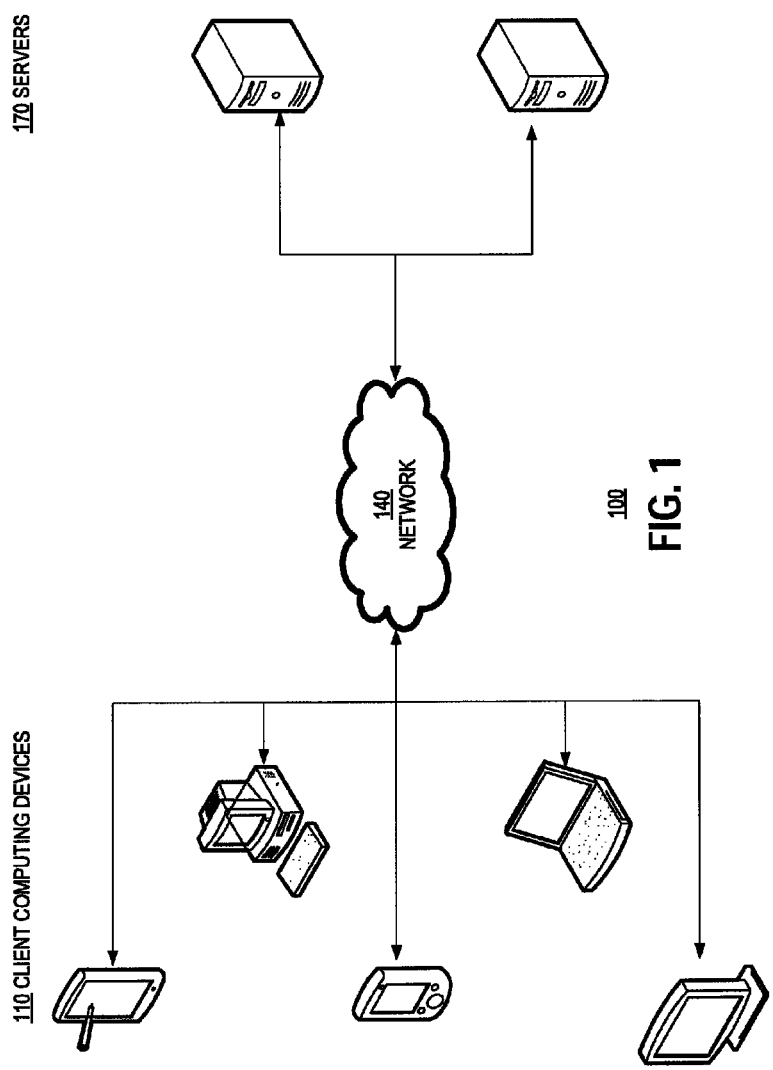
FIG. 1 illustrates an example of an architecture for automatic curation of digital images.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details. In some instances, well-known structures and components are shown in block diagram form in order to avoid obscuring the concepts of the subject technology.

According to certain aspects of the subject technology, systems and methods for automatic curation of digital images are provided.

It should be noted that the terms "photograph" or "image" as used herein encompass their plain and ordinary meaning, including, but not limited to digital images captured using digital cameras, stills captured from video files, screen captures, digitized images created based on printed matter, and the like. That is, the terms "photograph" or "image" refer to a digital image file, regardless of how the digital image was created.

As users amass large numbers of digital images, it is becoming increasingly challenging for users to curate their digital image collections. As an example, one of the challenges faced by users involves identification of images that might be considered "good," based on their technical specification or visual appeal.

A user may choose to define a "good" digital image based on its technical specifications (e.g., focus, white balance, aperture), its content (e.g., whether a person is blinking, or is not looking towards the camera), its uniqueness (e.g., as compared to other digital images in a collection), and so on. Similarly, the user may choose to define a "bad" digital image as one that is not "good," and is not redeemable based on adjustments to the digital image. For example, an image may be considered irredeemable when it is completely dark (e.g., when the lens is blocked by a lens cap), the camera fails to perform properly (e.g., the flash is not triggered), or the image is otherwise too noisy, grainy, or blurred to be corrected.

Regardless of how the user chooses to define a digital image as good or bad, certain aspects may be common to digital images matching either description. For example, based on a user's ranking of various digital images, it may be possible to determine the types of technical specifications or image content that are found in digital images that might be considered good or bad. As another example, based on rankings of digital images by a number of users, it may be possible to determine aspects that are found in digital images that might typically be considered good or bad.

Based on these technical aspects and the image content, an image quality score may be calculated for the digital image. A ranking may then be associated with the digital image based on its image quality score. For example, a rank may be assigned to the digital image based on the range of image quality scores it falls in.

Based on its ranking, a digital image may be provided for further processing. For example, the digital image may be provided for sharing by a user. A digital image with an image quality score lower than a certain value may be considered irredeemable.

In identifying a digital image as irredeemable, the subject technology may perform hypothetical operations on the digital image. For example, a digital image that appears completely dark may simply be underexposed and therefore could be corrected. In such a case, the subject technology may not consider the digital image to be irredeemable. Furthermore, the subject technology may provisionally calculate an image quality score, subject to committing the hypothetical processing to the digital image.

FIG. 1 illustrates an example of an architecture 100 for automatic curation of digital images. The architecture 100 includes client computing devices 110 and servers 170 connected over a network 140.

The client computing devices 110 can be, for example, mobile computers, tablet computers, mobile devices (e.g., a smartphone or PDA), desktop computers, set top boxes (e.g., for a television), video game consoles, or any other devices having processing capabilities, communications capabilities, and memory.

The network 140 can include any one or more of the Internet, a personal area network (PAN), a local area network (LAN), a campus area network (CAN), a metropolitan area network (MAN), a wide area network (WAN), a broadband network (BBN), and the like. Further, the network 140 can include, but is not limited to, any one or more of the following network topologies, including a bus network, a star network, a ring network, a mesh network, a star-bus network, tree or hierarchical network, and the like.

Inputs (e.g., pointer input, touch-based gestures, keystrokes) received from an input device can be processed locally on the client computing device 110 to which the input device is attached. Alternatively, if the data generated by the input device is provided to one of the many servers 170, the data can be processed on one of the many servers 170. For purposes of load balancing, data and software instructions may be stored and/or processed on multiple servers 170.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for load balancing) across multiple servers.

Figure 2:
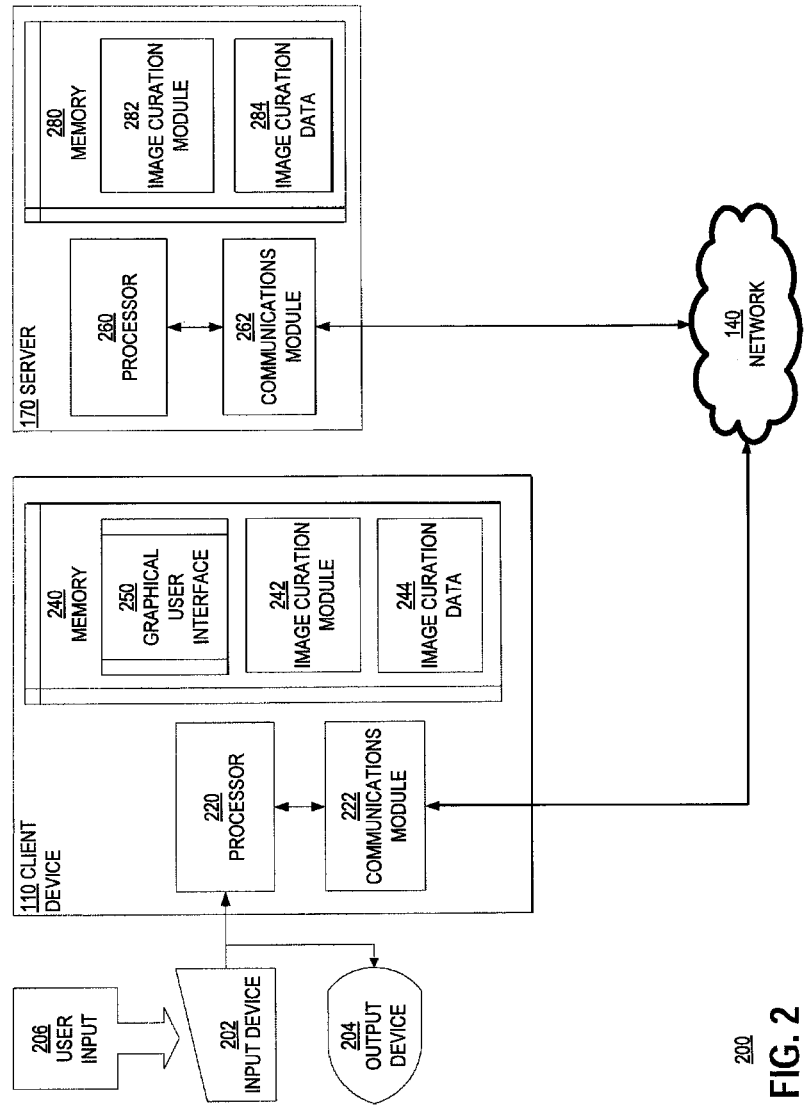
FIG. 2 is a block diagram illustrating an example of a client computing device and a server from the architecture of FIG. 1.

FIG. 2 is a block diagram 200 illustrating an example of a client computing device 110 and a server 170 in the architecture 100 of FIG. 1 according to certain aspects of the disclosure.

The client computing device 110 includes an input device 202, an output device 204, a processor 220, a communications module 222, and memory 240. The input device 202 can be a touchscreen, a mouse, a keyboard, an audio input device (e.g., a microphone), a video input device (e.g., a camera, a motion detector), or any other device to enable a user to supply input 206 to the client computing device 110. The output device 204 can be a display screen. Input 206 received via the input device 202 can be processed locally on the client computing device 110 and/or the server 170.

The client computing device 110 is connected to the network 140 via a communications module 222. The communications module 222 is configured to interface with the network 140 to send and receive information, such as data, requests, responses, and commands to other devices on the network 140. The communications module 222 can be, for example, a modem or Ethernet card.

The memory 240 includes a graphical user interface 250 which can be used by a user to interact with the client computing device 110 and/or the server 170, and can be used to display information to the user. The graphical user interface 250 may be installed locally at the client computing device 110 and/or downloaded from the server 170.

The memory 240 further includes software instructions which can be read by the processor 220, and include a image curation module 242. For example, the software instructions can include an operating system or an application (e.g., a web browser, a digital image management application), which includes the image curation module 242, and can be processed by the processor 220. Information generated or stored by the image curation module 242 can be stored as image curation data 244 in the memory 240.

In one implementation, the image curation module 242 includes instructions for automatic curation of digital images. Upon reading the software instructions of the image curation module 242, the processor 220 is configured to select one of every two or more duplicate digital images (e.g., images that are similar enough to one another for them to be considered as containing the same or substantially the same content) of a plurality of digital images. The processor 220 is further configured to calculate an image quality score for each of the selected digital images. The processor 220 is further configured to associate a ranking with each of the selected digital images based on its respective calculated image quality score.

In another implementation, upon reading the software instructions of the image curation module 242, the processor 220 is configured to calculate an image quality score for a digital image, based on the image content and the metadata of the digital image. The processor 220 is further configured to associate with the digital image, a ranking based on the calculated image quality score. The processor 220 is further configured to provide, based on the associated ranking, the digital image for sharing by a user.

In yet another implementation, upon reading the software instructions of the image curation module 242, the processor 220 is configured to calculate a first image quality score for a digital image. The processor 220 is further configured to calculate a second image quality score for the digital image based on a hypothetical adjustment of the digital image. The processor 220 is further configured to commit the hypothetical adjustment to the digital image in response to a received indication of user-selection. The processor 220 is further configured to associate with the digital image, a ranking based on the committing of the hypothetical adjustment.

The server 170 includes a memory 280, a processor 260, and a communications module 262. The processor 260 of the server 170 is configured to execute instructions, such as instructions physically coded into the processor 260, instructions read from the memory 280, or a combination of both. As an example, the processor 260 of the server 170 can read software instructions stored in the memory 280 to implement an image curation module 282.

The image curation module 282 can include software instructions that are similar to the image curation module 242 on the client computing device 110. The instructions in the image curation module 282 may be read by the processor 260 to execute the operations described above instead of, or in conjunction with the image curation module 242 on the client computing device 110. Thus, the subject technology described herein may be implemented such that the operations are performed on the client computing device 110, on the server 170, or on both the client computing device 110 and the server 170. Information generated or stored by the image curation module 282 can be stored as image curation data 284 in the memory 280.

The server 170 is connected to the network 140 via a communications module 262. The communications module 262 is configured to interface with the network 140 to send and receive information, such as data, requests, responses, and commands to other devices on the network 140. The communications module 262 can be, for example, a modem or Ethernet card.

Figure 3A:
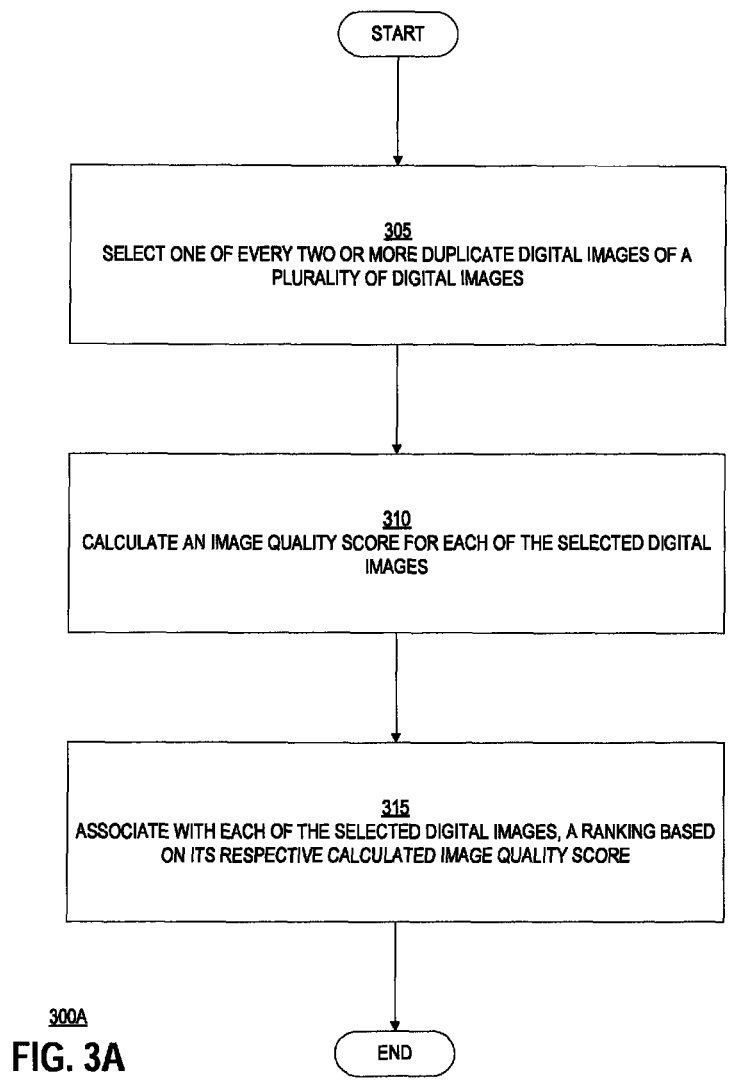
FIGS. 3A-C illustrate examples of processes for automatic curation of digital images.
Figure 3B:
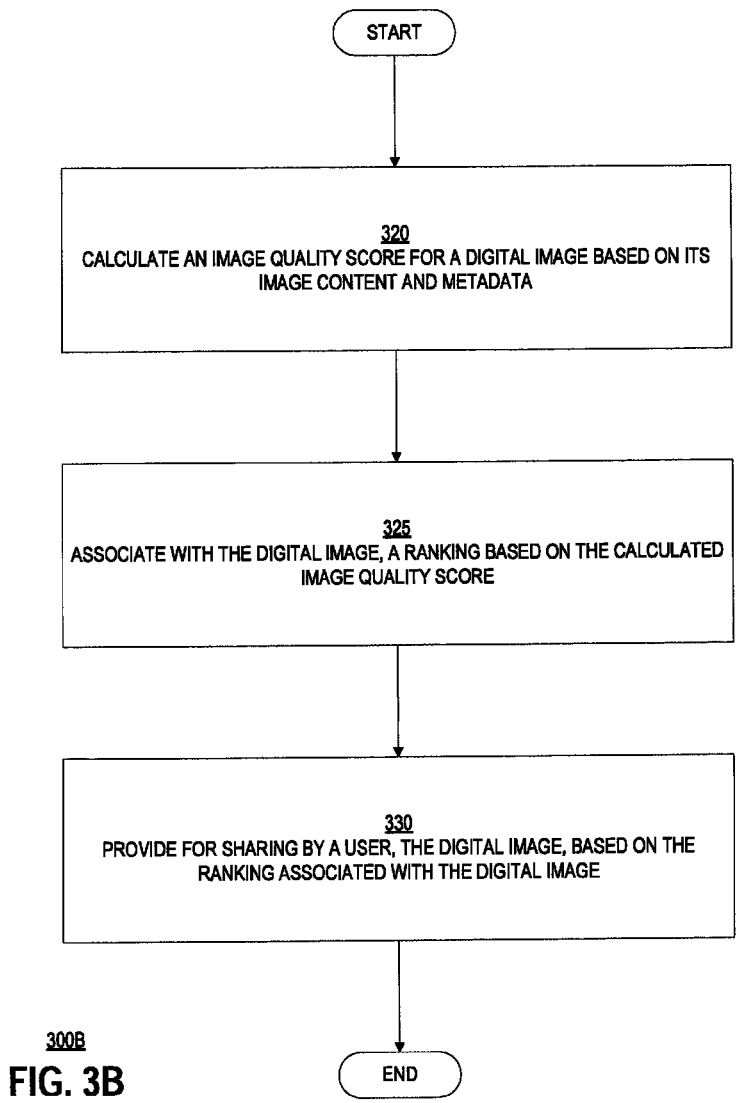
Figure 3C:
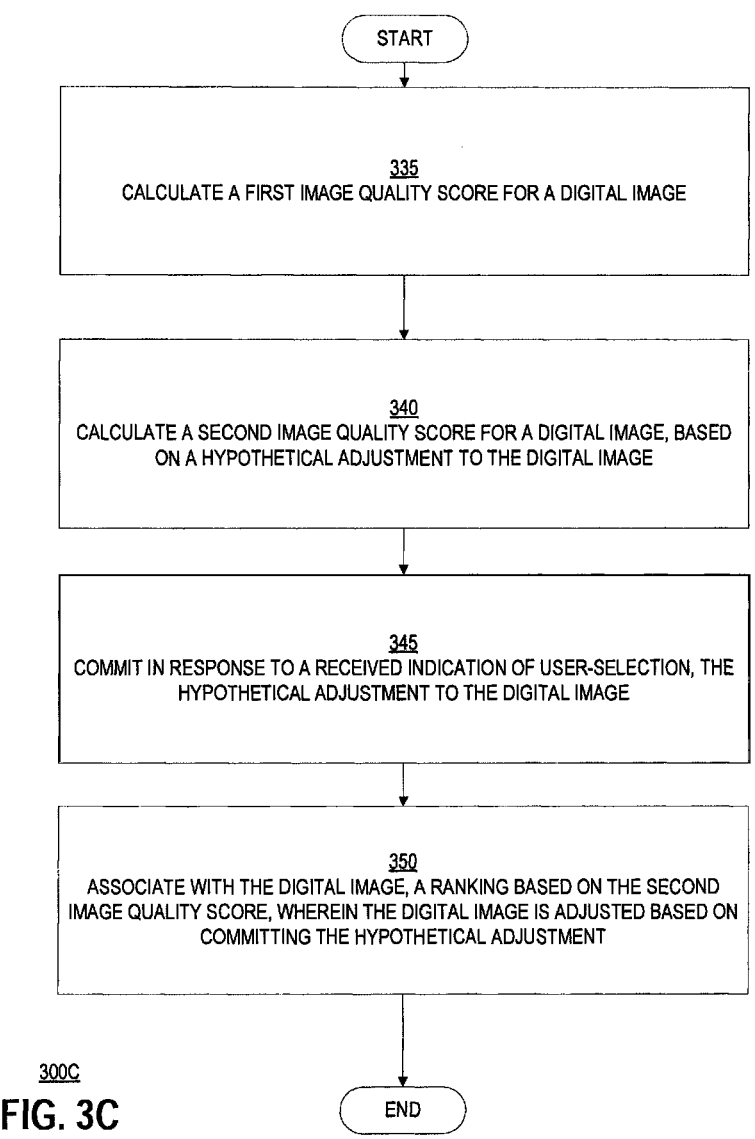

FIGS. 3A-C illustrate examples of processes 300A-C for automatic curation of digital images. It should be noted that processes 300A-C can be performed by a variety of configurations. For example, processes 300A-C can be performed on a server 170, a client computing device 110, or a combination of both.

FIG. 3A illustrates an example of a process 300A for automatic curation of digital images.

In Step 305, one of every two or more duplicate digital images are selected from a collection of digital images.

As part of this selection, the digital images in the collection are compared in a variety of ways to identify duplicates. In one implementation, the metadata of the digital images can be compared. Metadata of a digital image can include, for example, date and time information (e.g., timestamp), camera settings (e.g., camera make and model, orientation, aperture, shutter speed, focal length, metering mode, ISO speed), and geolocation, file size, file creation date, and image resolution information. In this implementation, once the duplicate digital images are identified based on their respective metadata, one of each set of duplicates can be selected.

A complete match between the metadata associated with two digital images can be a strong indication that they are exact duplicates of each other. However, when images are selected based on a complete match in metadata, even minor differences in, or alterations to one of the digital images can lead to the digital images being considered unique. For example, in an instance where a high-speed camera is used to capture several frames per second, each of the photographs can be considered unique (e.g., based on the differences in filenames, timestamps) though they may be visually indistinguishable by a user. Thus, in accordance with certain aspects of the disclosure, images that do not have a complete match in metadata with one another, but nevertheless have substantially the same metadata, can still be considered to be duplicate images. In some aspects, images that have at least a 98%, a 95%, a 93%, a 90%, an 85%, an 80%, a 75%, a 70%, a 65%, or a 60% match in metadata with one another may be considered duplicate images.

In Step 310, an image quality score is calculated for each of the selected digital images. In calculating the image quality score of a selected digital image, its uniqueness with respect to other selected digital images, is considered. To the extent that any persons are depicted in the selected digital image, various aspects of the person can be considered.

The uniqueness of a selected digital image can be determined based on the image content of the selected digital image with respect to the image content of other selected digital images. As an example, where the first selected digital image and the second digital image depict persons, the set of persons depicted in the first selected digital image can be compared to the set of persons depicted in the second selected digital image.

In some instances, a user may have several digital images of the same subject from different perspectives. The subject can be a landmark, an object, a person and so on. As an example of a landmark, a user may have several digital images of Mount Rushmore from various perspectives. As another example of a landmark, a user may have several digital images of the Eiffel Tower.

In comparing the perspectives of a subject (e.g., a landmark, an object, a person) the appearance of the subject can be compared to known digital images of that subject. For example, digital images of Mount Rushmore or Eiffel Tower from various perspectives are readily available.

Geolocation data can also be used in comparing perspectives of a subject. For example, in a case where two selected digital images have a high similarity based on their respective content, geolocation data can be used to further increase or decrease the likelihood that the two selected digital images are taken around the same location, and may be of the same subject.

To the extent that a selected digital image includes (e.g., in metadata) orientation information from a device such as a compass or a gyroscope, such orientation information can also be used to further increase or decrease the likelihood that the selected digital images are two perspectives of the same subject.

Based on geolocation and/or orientation information, a selected digital image can be analyzed more rigorously for its level of uniqueness. For example, a digital image of the Eiffel Tower that includes geolocation information indicating a location in France, can be compared more rigorously with another image of the Eiffel Tower that also indicates a location in France. Conversely, a digital image of the Eiffel Tower that includes geolocation data indicating a location in France can be distinguished from a visually identical or similar digital image of a facsimile of the Eiffel Tower that includes geolocation data indicating a location (e.g., an amusement park, a casino) in the United States.

When the subject is a person, digital images from various perspectives can be compared based on analysis of the person's appearance and/or the background. For example, a person's attributes such as height, skin tone, hair color, hair length, body contours, clothing, teeth, eye shape, eye color, and so on can be compared. The perspectives in the selected digital images can be compared to perspectives that are extrapolated based on algorithms.

Another example of an approach to comparing perspectives of a person includes constructing three-dimensional renderings of a person based on any descriptors provided by the user. For example, if the user has associated a descriptor such as "John Smith" to multiple digital images, the various digital images can be used to construct a three-dimensional rendering of "John Smith," and compare the perspective of a particular digital image with that three-dimensional rendering. The rendering may also include time as a component. That is, a rendering of "John Smith" in one range of dates may be different from a rendering of "John Smith" in another range of dates.

When a selected digital image depicts a number of persons, each of the persons in the digital image can be compared to persons in other digital images. Such a comparison can be useful in determining the level of uniqueness of unique digital images, especially in combination with comparisons of the backgrounds and other metadata. For example, where multiple users capture digital images of guests at a gathering, the various digital images can be compared against each other to identify unique digital images. In one implementation, such a comparison can lead to identification of unique digital images that include a greater variety of persons.

Image quality scores can also be based on a relationship of a user (e.g., the owner of the digital images) with a person depicted in the unique digital image. The relationship between the user and the person depicted in the unique digital image can be determined based on a variety of information. For example, the person depicted in the photograph can be compared to persons depicted in the user's social network. As another example, a caption or a descriptor associated with the digital image can be used as an indicator of the relationship between the user and the person depicted in the digital image.

In a unique digital image depicting a person, the quality score of the unique digital image can be based on an orientation of the person's face with respect to the camera capturing the unique digital image. For example, a digital image depicting a person looking away from the camera may have a lower quality score than the photograph depicting a person whose eyes are visible in the digital image. The orientation of the person's eyes can also be considered. For example, a digital image depicting a person who, for example, is facing the camera but is momentarily distracted and looks away, may have a quality score that is lower than a digital image depicting a person who is facing the camera, and is also looking towards the camera.

Whether a person is blinking at the time that a digital image is captured can also be considered. For example, a digital image depicting a person with their eyes open may have a quality score that is higher than a digital image depicting a person with their eyes partially or completely closed.

Whether a person is smiling at the time that a digital image is captured can also be considered. Fore example, a digital image depicting a person who is smiling may have a higher image quality score than a digital image depicting a person who is not smiling.

The blink status and smile status of a digital image can be correlated intelligently. For example, a person may have closed their eyes due to laughing. In such a case, the contours of the person's smile, the tilt of their head, can also be considered in combination with whether the person is smiling (e.g., laughing).

In Step 315, a ranking may be associated with each of the selected digital images based on its respective calculated image quality score. For example, images can be ranked on a numerical scale (e.g., 0 to 5, 1 to 10, 1 to 100), a graduated scale (e.g., from "Best" to "Worst," "5 Stars" to "1 Star"), a percentage scale, or the like. The ranking can also be binary e.g., 0 and 1, "Good" and "Bad," "Thumbs Up" and "Thumbs Down."

In one implementation, a range of image quality scores may correspond to a particular ranking. In another implementation, the ranking may be based on an adjustment or manipulation of the image quality scores. For example, the image quality scores may be normalized, manipulated to conform to a Gaussian function, percentiles, and so on.

In some implementations, the ranked digital images may be provided for further processing, based on their respective image quality scores and/or rankings. For example, based upon their image quality scores and/or rankings, some or all of the digital images may be provided for sharing by a user. The user may share the digital images through a variety of means. For example, the user may upload the provided digital images to a social network, an image hosting service (e.g., website, backup service), a location (e.g., a folder), and so on.

As another example, a provided digital image may be used as representative of the other provided digital images, the digital images selected in Step 305, or the collection of digital images from which the non-duplicate digital images are selected in Step 305. An example of a representative digital image can be a cover photo of a digital image album (e.g., on a website), a thumbnail or icon (e.g., of a folder), and so on.

Based upon the image quality score and/or ranking, digital images that are irredeemable may also be identified. The term "irredeemable" as used herein encompasses its plain and ordinary meaning, including, but not limited to a digital image that is considered of a quality that is so low that adjustments would likely not cause a significant improvement in its quality.

A digital image may have an image quality score that is low due to a number of reasons, in addition to the various reasons described above. For example, a digital image that is blurry (e.g., motion-blur, camera-shake, out-of-focus), incorrectly exposed (e.g., over-exposed, under-exposed), noisy, grainy, or has an incorrect white balance may have a low image quality score. Other reasons for a low image quality score can include not having a discernible subject. A digital image may not have a discernible subject where, for example, a lens cap is accidentally left on a camera's lens, or an object (e.g., a finger) blocks all or a certain portion of the frame.

A digital image that was selected in Step 305 may be deselected based on having a low image quality score. When a digital image is deselected, an explanation of the deselection may be provided for display. The explanation can include text describing the reasons (e.g., blurriness, duplicate). The explanation can be displayed on a display screen, or other output device 204 of a client computing device 110.

A user may override the deselection of a digital image. For example, in one implementation, an override option can be provided for display along with the explanation. When the explanation is provided, the user can use a mouse or other input device 202 to select an option to override the deselection. When an indication of the user-selection of the override option is received (e.g., by the client computing device 110 or the server 170), the digital image can be reselected.

Just as the user may override the deselection of a deselected digital image, the user may override other steps in the process 300A. For example, with respect to Step 305, the user may cause duplicate digital images (which are not selected in Step 305) to be selected for the remainder of the process 300A. Similarly, with respect to Step 310, the user may alter (e.g., by manually entering) the image quality scores of digital images. And, with respect to Step 315, the user may alter, regardless of the image quality score, the rankings associated with digital images.

FIG. 3B illustrates another example of a process 300B for automatic curation of digital images.

Step 320 is similar to Step 310 in that an image quality score is calculated for one or more digital images. In Step 320, the importance (e.g., weight) of the metadata may be the same or different than that in Step 310.

In some implementations of Step 320, the metadata of a digital image may be given greater consideration. For example, in a case where the metadata of a digital image indicates that the lens cap was not removed when the digital image was captured, the content of the digital image may not be analyzed as thoroughly, or may not be analyzed altogether. One effect of placing greater emphasis on the metadata may be that processing time(s), such as the time involved in executing Step 320, may be reduced.

In other implementations of Step 320, the metadata of a digital image may be given less consideration. For example, in a case where the metadata of a digital image indicates a presence of a red-eye effect, the image content may be analyzed more thoroughly to determine whether such a red-eye effect indeed exists.

Step 325 is similar to Step 315 in that a ranking may be associated with a digital image based on its image quality score.

In Step 330, one or more digital images may be provided for sharing based on their respective rankings. The rankings are based on image quality scores that are calculated in Step 320.

In some implementations, the rankings may be those that are provided (e.g., overridden) by the user. Or, the rankings may be based on image quality scores provided (e.g., overridden) by the user.

FIG. 3C illustrates another example of a process 300C for automatic curation of digital images.

Step 335 is similar to Step 310 in that an image quality score is calculated for a digital image. This image quality score is referred to herein as a first image quality score.

In Step 340, additional image quality scores are calculated for the digital image based on one or more hypothetical adjustments of the digital image. As an example, in a case where a digital image has an incorrect white balance, a second image quality score may be calculated based on the adjustment of the white balance of the digital image. As another example, in a case where the digital image is dark, for example, due to poor lighting or underexposure, a second image quality score may be calculated based on adjustment of the exposure or light levels of the digital image.

Image quality scores may be calculated for each of the hypothetical adjustments, and various combinations thereof. For example, in a case where a first hypothetical adjustment (e.g., white balance) and a second hypothetical adjustment (e.g., exposure correction) can improve the image quality score of a digital image, up to four image quality scores may be calculated. In this example, the four image quality scores may correspond to (1) the first hypothetical adjustment, (2) the second hypothetical adjustment, (3) the first hypothetical adjustment followed by the second hypothetical adjustment, and (4) the second hypothetical adjustment followed by the first hypothetical adjustment.

It should be noted that the hypothetical adjustments may be made to copies of the digital image. That is, the digital image may remain unaltered or preserved in spite of the hypothetical adjustments.

Calculations of the second image quality score may be useful when the image quality score and/or ranking of a digital image is low. As an example, where a digital image has a low image quality score, a user-selectable option may be provided to commit the hypothetical adjustment(s) that causes an increase in the image quality score.

In one implementation, copies of the digital image may be provided along with their respective second image quality scores based upon hypothetical adjustments. A user can then use a mouse or other input device 202 to select one or more hypothetical adjustments.

In Step 345, in response to a received indication of the user-selection, the adjustment(s) may be committed. In some implementations, the hypothetical adjustment(s) may be committed to the original digital image. In other implementations, the hypothetical adjustment(s) may be committed to a copy of the original digital image.

Step 350 is similar to Step 315 in that a ranking may be associated with a digital image based on its image quality score. In Step 350, this ranking is based on the second image quality score calculated in Step 340 for the digital image.

Figure 4:
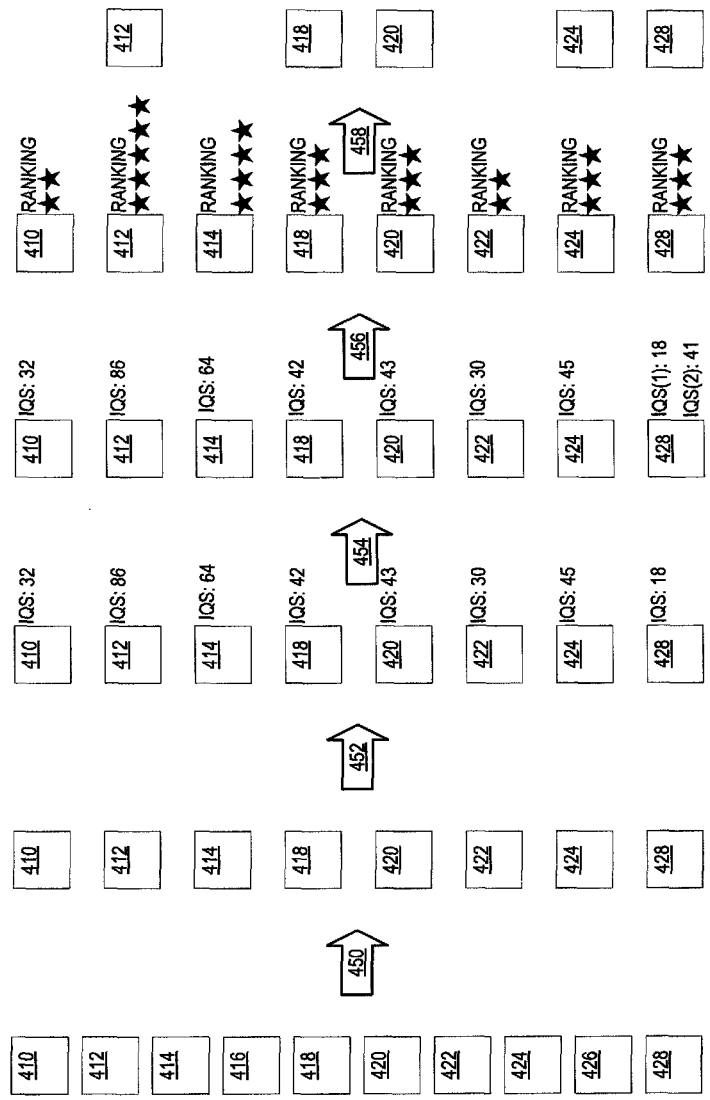
FIG. 4 illustrates an example of curation of digital images based on the preceding examples of processes 300A-C.

FIG. 4 illustrates how the steps of processes 300A-C may be applied to a collection of digital images.

In the example of FIG. 4, the collection of digital images includes 10 digital images 410-428. The digital images 410-428 may have been captured using different cameras, and may be located in multiple locations (e.g., on a server 170 and a client computing device 110). For the purposes of this example, the digital images 410-428 are considered part of the same collection of digital images.

In Step 450, non-duplicate digital images are selected as described above with respect to Step 305. In this example, digital images 416 and 426 are exact duplicates of digital image 410, which were created when the digital image 410 was imported into the digital image collection 410-428 repeatedly. As a result of Step 450, digital images 416 and 426 are not selected.

In Step 452, an image quality score (denoted by "IQS" in FIG. 4) is calculated for each of the selected digital images 410, 412, 414, 418, 420, 422, 424, and 428. In this example, image quality scores are calculated on a scale of 1 to 100, as described above with respect to each of Steps 310, 320, and 335.

The selected digital images 410, 412, 414, 418, 420, 422, 424, and 428 have image quality scores of 32, 86, 64, 42, 43, 30, 45, and 18, respectively. The image quality scores of the digital images are calculated based on the various factors described above with respect to processes 300A-C, and in particular, with respect to each of Step 310, Step 320, and Step 335.

When the content of the selected digital images is analyzed, it is determined that digital images 410, 412, and 414 include different perspectives of a well known landmark. This determination is made based on analysis of the content of the digital images 410, 412, and 414. The determination has an elevated confidence level because geolocation data for each digital image indicates locations from which the landmark is visible.

Digital image 410 is of a lower resolution than digital images 412 and 414. And, among the three digital images 410, 412, and 414, digital image 412 has the better perspective, white balance, sharpness of focus, composition, and so on. Digital image 428 has a relatively low image quality score of 18 because it was taken in low lighting conditions and has an incorrect white balance.

In Step 454, hypothetical adjustments, as described above with respect to Step 340, are made to copies of digital image 428. The hypothetical adjustments include increasing sharpness, and correcting the white balance. Based on the hypothetical adjustments, it is determined that the image quality score of digital image 428 could be increased from 18 to 41.

Based on an indication of a user-selection, the hypothetical adjustments are committed to digital image 428, as described above with respect to Step 345.

In Step 456, rankings are associated with each of the selected digital images 410, 412, 414, 418, 420, 422, 424, and 428, as described above with respect to each of Step 315, 325, and 350. In this example, the ranking associated with digital image 428 is based on the second image quality score of 41, which was calculated in Step 454, as described above with respect to Step 345.

The ranking system in this example, is based on ranges of image quality scores corresponding to stars on a 5-star scale. Specifically, image quality scores of 1-20 are associated with a ranking of one star, image quality scores of 21-40 are associated with a ranking of two stars, image quality scores of 41-60 are associated with a ranking of three stars, image quality scores of 61-80 are associated with a ranking of four stars, and image quality scores of 81-100 are associated with a ranking of five stars.

Based on the image quality scores, a ranking of two stars is associated with digital images 410, and 422, a ranking of three stars is associated with digital images 418, 420, 424, and 428, a ranking of four stars is associated with digital image 414, and a ranking of five stars is associated with digital image 412.

In Step 458, digital images are provided for sharing on a social network, as described above with respect Step 330. In this implementation, digital images which have rankings of three or more stars, and are truly unique are provided for sharing.

Digital image 412 is provided for sharing based on its five star rating. Digital image 414 is not provided because it is a digital image of the same landmark as depicted in digital image 412, but from a different perspective. Digital images 418, 420, 424, and 428 are provided for sharing based on their rankings of three stars.

Figure 5:
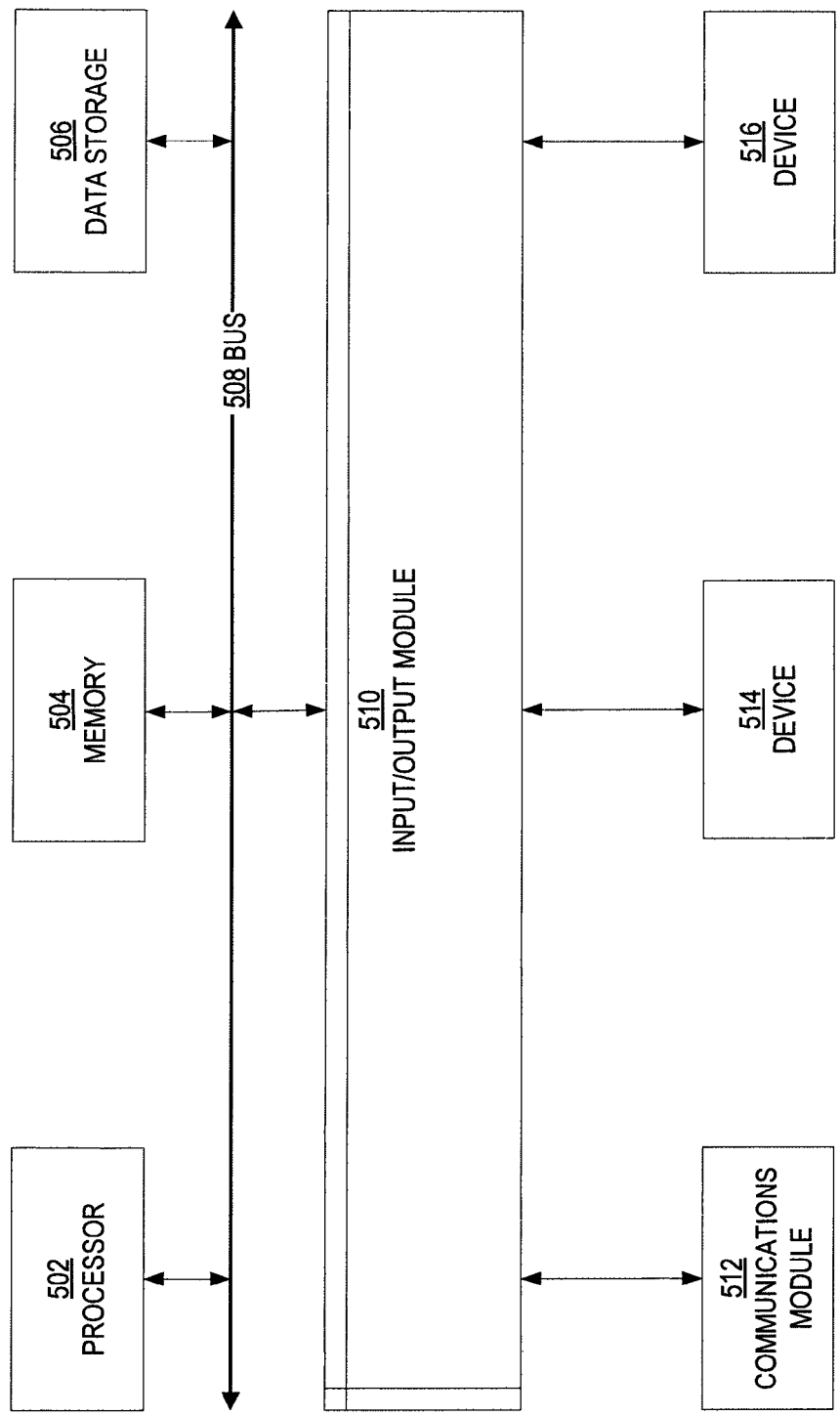
FIG. 5 conceptually illustrates an electronic system with which some aspects of the subject technology can be implemented.

FIG. 5 conceptually illustrates an electronic system with which some aspects of the subject technology can be implemented. For example, FIG. 5 illustrates an example of a computer system 500 with which the client computing device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client computing device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk, optical disk, or solid state disk coupled to bus 508 for storing information and instructions. Computer system 500 may be coupled via input/output module 510 to various devices. The input/ output module 510 can be any input/output module. Examples of input/output modules 510 include data ports such as USB ports. The input/output module 510 is configured to connect to a communications module 512. Examples of communications modules 512 (e.g., communications module 222, communications module 262) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the client computing device 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include client computing devices and servers. A client computing device and server are generally remote from each other and typically interact through a communication network. The relationship of client computing device and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for automatic curation of digital images, the method comprising:
   selecting one of every two or more duplicate digital images of a plurality of digital images;
   determining an image quality score for each of the selected digital images based on content and metadata of the respective digital image, the content being processed with a first processing time if an indication in the metadata corresponds to placing greater emphasis on the metadata than the content, the content being processed with a second processing time if the indication in the metadata corresponds to placing greater emphasis on the content than the metadata, the second processing time being greater than the first processing time;
   associating with the each of the selected digital images, a ranking based on its respective image quality score;
   generating image curation data that includes each of the selected digital images with the associated ranking; and
   providing, for transmission, a digital image from the image curation data based on the associated ranking, the provided digital image being a representative digital image for the selected digital images in the image curation data.

2. The computer-implemented method of claim 1, wherein the selecting is based on a comparison of metadata of each of the plurality of digital images.

3. The computer-implemented method of claim 1, wherein the image quality score is based on a level of uniqueness of each of the selected digital images.

4. The computer-implemented method of claim 3, wherein a first selected digital image comprises a first image content and a second selected digital image comprises a second image content, and the level of uniqueness of the first selected digital image is determined based on a comparison of the first image content with the second image content of the second selected digital image.

5. The computer-implemented method of claim 4, wherein first image content comprises a first plurality of persons, and wherein the second image content comprises a second plurality of persons.

6. The computer-implemented method of claim 4, wherein the first image content comprises a first perspective of a subject, and wherein the second image content comprises a second perspective of the subject.

7. The computer-implemented method of claim 6, wherein the subject is a landmark.

8. The computer-implemented method of claim 6, wherein the subject is a person.

9. The computer-implemented method of claim 1, wherein a first selected digital image of the selected digital images depicts a person, and wherein the image quality score of the first selected digital image is based on an aspect of the person depicted in the first digital image.

10. The computer-implemented method of claim 9, wherein the aspect is a relationship of a user with the person depicted in the first selected digital image.

11. The computer-implemented method of claim 9, wherein the aspect is an orientation of the person's face with respect to a camera with which the first selected digital image is captured.

12. The computer-implemented method of claim 9, wherein the aspect is an orientation of the person's eyes with respect to a camera with which the first selected digital image is captured.

13. The computer-implemented method of claim 9, wherein the aspect is a blink status of the person's eyes.

14. The computer-implemented method of claim 9, wherein the aspect is a smile status of the person.

15. The computer-implemented method of claim 1, further comprising:
   deselecting a first digital image of the selected digital images based on the respective image quality score of the first digital image; and
   providing for display, an explanation of the deselecting of the first digital image.

16. The computer-implemented method of claim 15, further comprising:
   reselecting, based on a received indication of a user-selection, the first digital image.

17. A system for automatic curation of digital images, the system comprising:
   a memory comprising instructions for automatic curation of digital images; and a processor configured to execute the instructions to:
     calculate an image quality score for a digital image, wherein the calculation is based on each of an image content of the digital image and metadata of the digital image, the image content being processed with a first processing time if an indication in the metadata corresponds to placing greater emphasis on the metadata than the image content, the image content being processed with a second processing time if the indication in the metadata corresponds to placing greater emphasis on the image content than the metadata, the second processing time being greater than the first processing time;
     associate with the digital image, a ranking based on the calculated image quality score;
     generate image curation data that includes each of the selected digital images with the associated ranking; and
     provide, for transmission, a digital image from the image curation data based on the associated ranking, the provided digital image being a representative digital image for the selected digital images in the image curation data.

18. A non-transitory computer-readable medium encoded with executable instructions that, when executed by a processor, cause the processor to perform a method comprising:
   selecting one of every two or more duplicate digital images of a plurality of digital images;
   determining an image quality score for each of the selected digital images based on content and metadata of the respective digital image, the content being processed with a first processing time if an indication in the metadata corresponds to placing greater emphasis on the metadata than the content, the content being processed with a second processing time if the indication in the metadata corresponds to placing greater emphasis on the content than the metadata, the second processing time being greater than the first processing time;

associating with the each of the selected digital images, a ranking based on its respective image quality score;

generating image curation data that includes each of the selected digital images with the associated ranking; and providing, for transmission, a digital image from the image curation data based on the associated ranking, the provided digital image being a representative digital image for the selected digital images in the image curation data.

* * * * *